United States Patent
Sugiyama et al.

(10) Patent No.: US 8,724,224 B2
(45) Date of Patent: May 13, 2014

(54) DISPLAY DEVICE USING A DIHEDRAL CORNER REFLECTOR ARRAY OPTICAL ELEMENT

(75) Inventors: Takashi Sugiyama, Tokyo (JP); Satoshi Maekawa, Koganei (JP)

(73) Assignees: Stanley Electric Co., Ltd., Tokyo (JP); National Institute of Information and Communications Technology, Tokyo (JP)

(*) Notice: Subject to any disclaimer, the term of this patent is extended or adjusted under 35 U.S.C. 154(b) by 219 days.

(21) Appl. No.: 13/309,819

(22) Filed: Dec. 2, 2011

(65) Prior Publication Data

US 2012/0140325 A1 Jun. 7, 2012

(30) Foreign Application Priority Data

Dec. 3, 2010 (JP) ................. 2010-270257

(51) Int. Cl.
*G02B 27/10* (2006.01)
(52) U.S. Cl.
USPC ............................ 359/627; 353/28; 359/625
(58) Field of Classification Search
USPC ................. 359/529–530, 834, 836, 625–627; 353/28
See application file for complete search history.

(56) References Cited

U.S. PATENT DOCUMENTS

2012/0050876 A1* 3/2012 Sugiyama et al. ............ 359/625

FOREIGN PATENT DOCUMENTS

JP 201119140 * 9/2011
WO WO2007/116639 A1 10/2007

* cited by examiner

*Primary Examiner* — James Phan
(74) *Attorney, Agent, or Firm* — Holtz, Holtz, Goodman & Chick, PC (57) ABSTRACT

A display device includes a dihedral corner reflector array optical element composed of a substrate and a plurality of dihedral corner reflectors arranged regularly on one main surface of the substrate, the dihedral corner reflectors including orthogonal mirror planes perpendicular to each other and being perpendicular to the main surface of the substrate; and an object existing by the one surface of the substrate, the optical element forming a real image of the object by the other main surface of the substrate. The optical element includes a plurality of protrudent bodies integrally formed of a transparent material of the substrate, each of the protrudent bodies including two sides of orthogonal mirror planes perpendicular to each other as the dihedral corner reflector perpendicular to the main surface of the substrate. The optical element is disposed so that the protrudent bodies face toward a space in which the object exists.

3 Claims, 9 Drawing Sheets

DISPLAY DEVICE USING A DIHEDRAL CORNER REFLECTOR ARRAY OPTICAL ELEMENT

BACKGROUND OF THE INVENTION

1. Field of the Invention

The present invention relates to a reflective real specular image forming element forming a real image (real specular image) of an observed object in a space of a viewer side, and more particularly to a display device using a dihedral corner reflector array optical element.

2. Description of the Related Art

There have been suggested a display device for allowing a viewer to see a real image (real specular image) of an observed object in air (see Patent Publication WO2007-116639).

Specifically, such a display device comprises a reflective real specular image forming element performing the formation of a real image (real specular image) of an observed object in a space of a viewer side; and the observed object disposed in a space opposite to the viewer side with respect to the reflective real specular image forming element.

Figure 1:
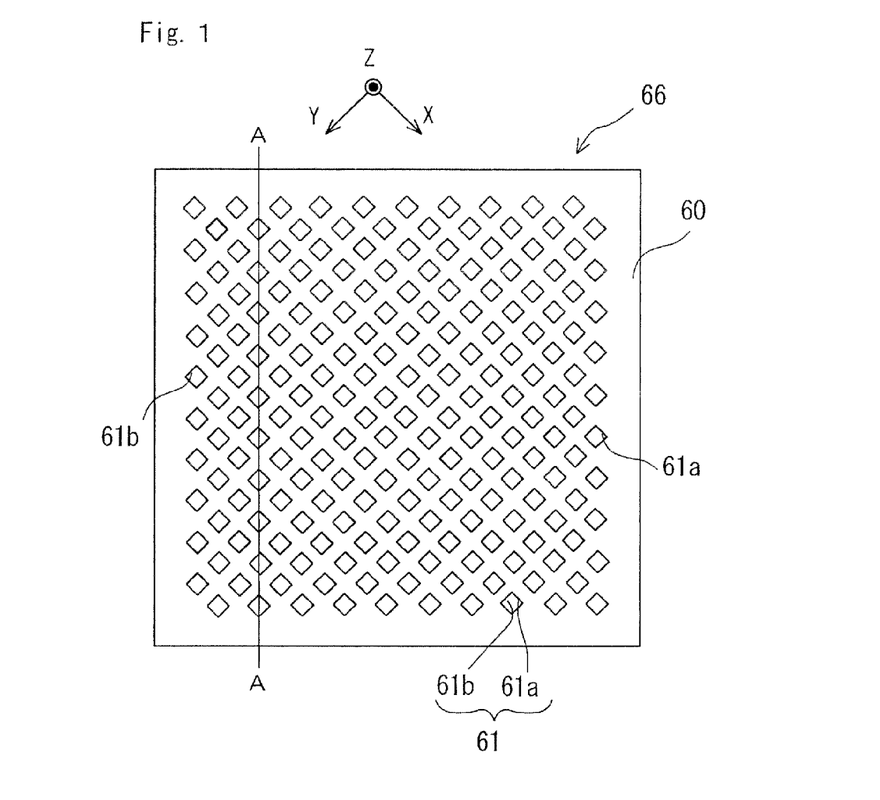
FIG. 1 is a plan view illustrating schematically a specific embodiment of the dihedral corner reflector array optical element.
Figure 2:
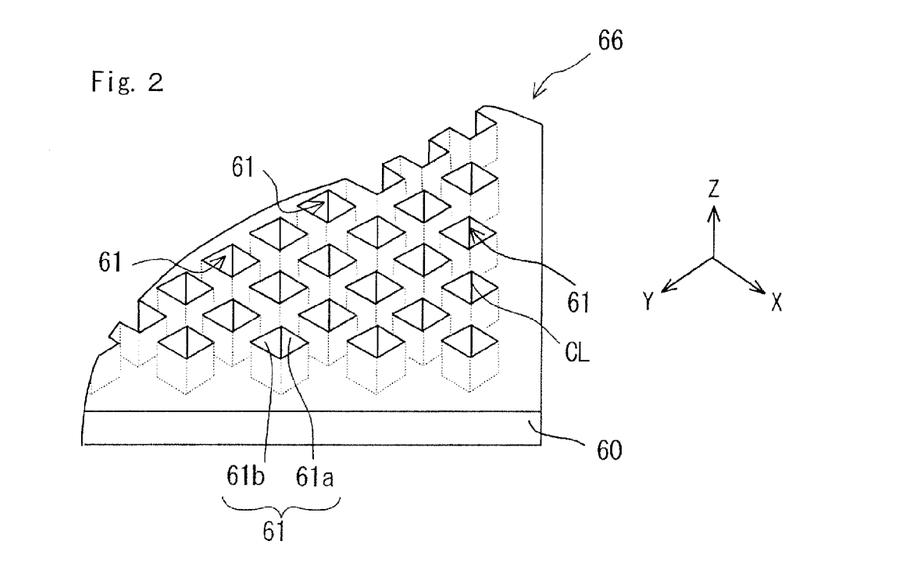
FIG. 2 shows an enlarged partial cutaway perspective view illustrating schematically a specific embodiment of the dihedral corner reflector array optical element.
Figure 3:
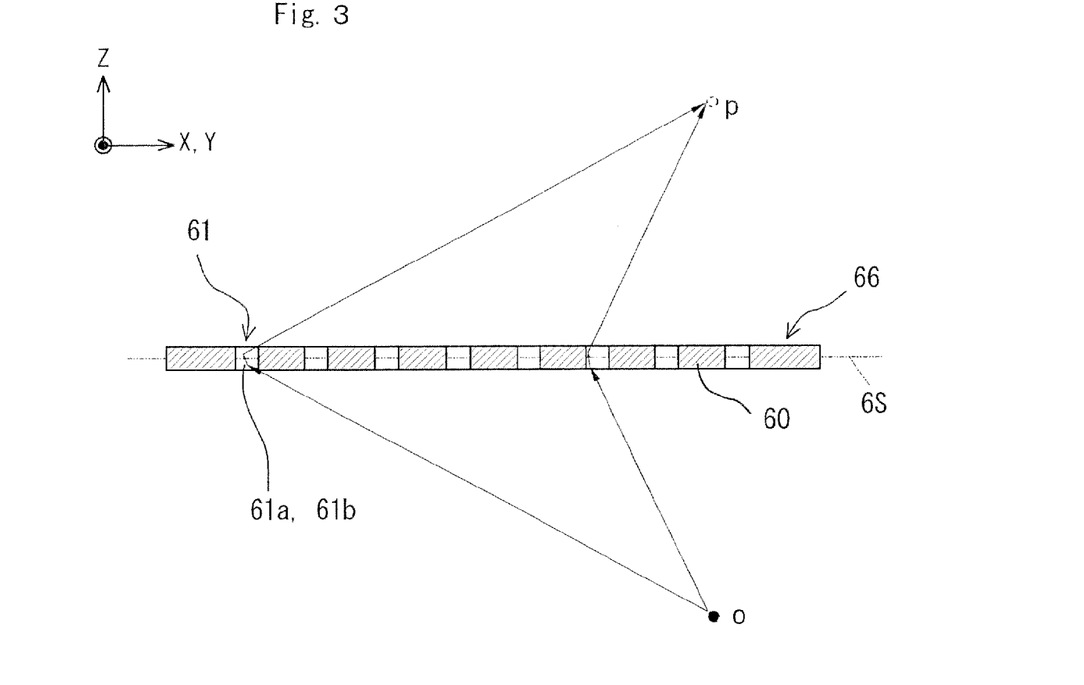
FIG. 3 shows schematically a partial cross-section view taken off at an A-A line in FIG. 1.

The document WO2007-116639 discloses a reflective real specular image forming element (so-called the dihedral corner reflector array optical element) in which a plurality of unit optical elements (each so-called as dihedral corner reflector) are arranged regularly on one plane of the element face wherein each of unit optical elements has two orthogonal mirror surface which are perpendicular to each other. FIGS. 1, 2 and 3 shows a schematic plan view, an enlarged partial cutaway perspective view and a cross-section view which illustrate specific embodiments of the dihedral corner reflector array optical elements disclosed by WO2007-116639 respectively.

FIG. 1 shows as a specific embodiment of the dihedral corner reflector array optical element which specifically utilizes inner walls 61a and 61b (mirror surfaces) of each square shaped hole made in a substrate 60 while penetrating the main face thereof as a dihedral corner reflector 61 disclosed by WO2007-116639. As shown in FIGS. 1 and 2, the dihedral corner reflector array optical element 66 comprises the substrate 60 of a thick flat plate and a plurality of square shaped holes made therein so as to physically and optically penetrate the thick thickness thereof perpendicular to the main face thereof where mirror surfaces 61a, 61b of two orthogonal flat internal sides within each penetrating hole are formed as the dihedral corner reflector 61. As shown in FIG. 3, the dihedral corner reflector (mirror surfaces 61a, 61b of the penetrating hole) reflects twice a ray of light emitted from a point light source (o) while passing trough the substrate 60 with a bend.

Figure 4:
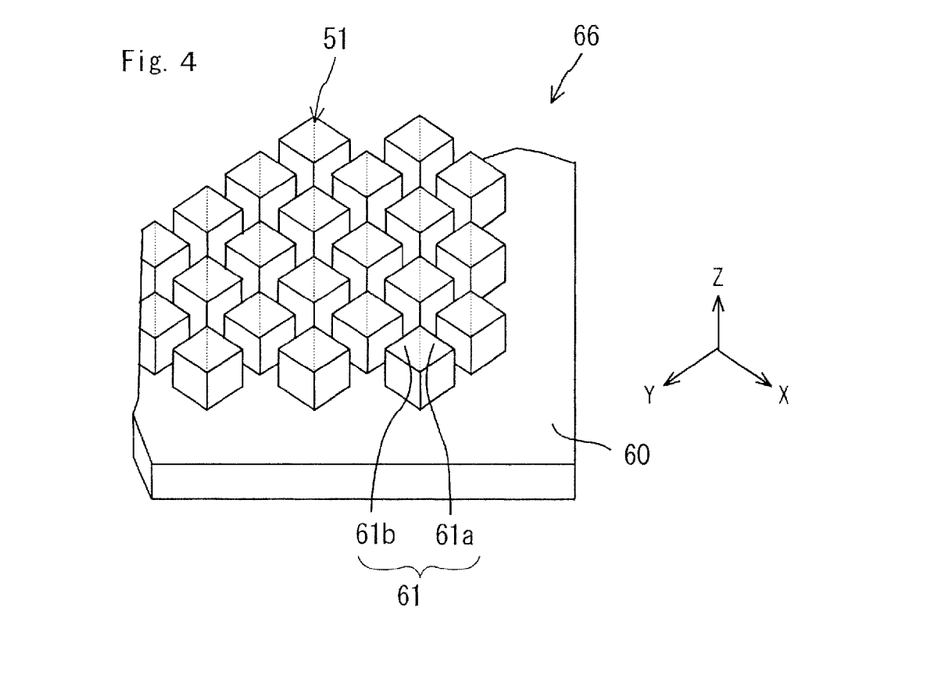
FIG. 4 shows an enlarged partial cutaway perspective view illustrating schematically another specific embodiment of the dihedral corner reflector array optical element.
Figure 5:
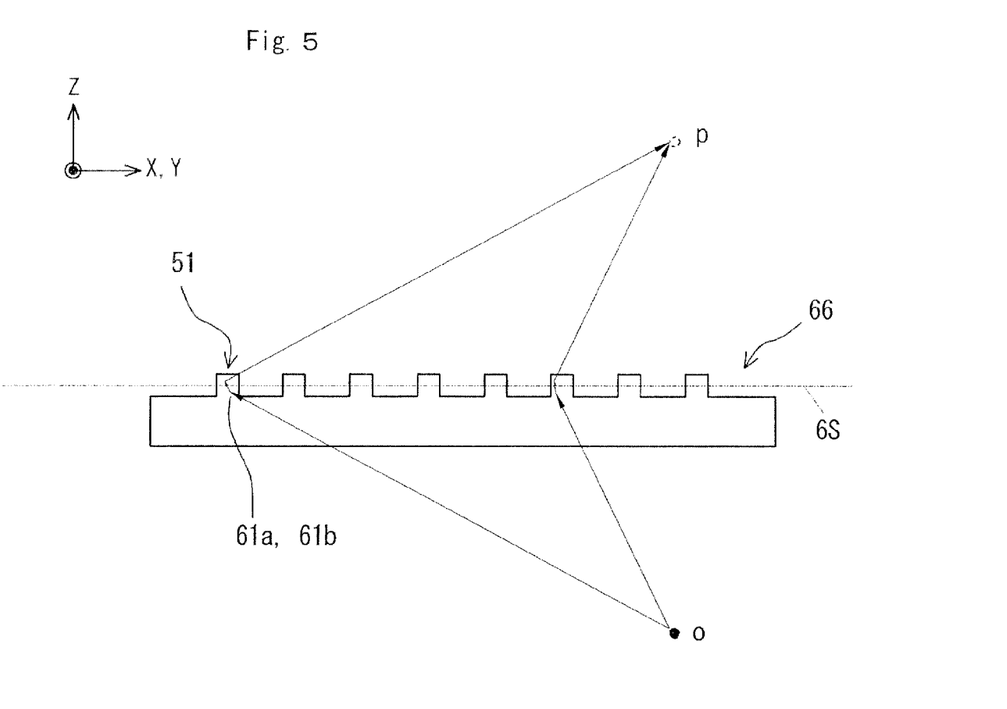
FIG. 5 shows a partial cross-section view illustrating schematically another specific embodiment of the dihedral corner reflector array optical element.

Further as shown in FIG. 4, there is also disclosed by WO2007-116639 a dihedral corner reflector array optical element comprising a plurality of transparent cubic shape tubular bodies 51 each perpendicularly protruding in the thickness direction (Z) from the surface of the substrate 60 (XY plane) made of a transparent material from wherein inner wall surfaces (mirror surfaces 61a and 61b) of the transparent cubic shape tubular body 51 are used for the dihedral corner reflector 61, wherein the tubular bodies are laid out in a grid pattern.

In a plurality of the arranged dihedral corner reflector of the dihedral corner reflector array optical element, since each mirror surface is disposed perpendicularly to the element face, light (emitted from the observed object existing on the one side of the element face) is reflected twice by the dihedral corner reflector during passing therethrough, and then by all light passed through the element, a real image is formed in a space of observed object absent on the other side of the element face. Namely, the dihedral corner reflector array optical element performs the formation of real image in such a manner that the real image of the object exists symmetrical to the observed object with respect to the element face (so-called a plane of symmetry) of the dihedral corner reflector array optical element.

SUMMARY OF THE INVENTION

In the prior art, there is suggested that a dihedral corner reflector array optical element can be used for a display device for forming a real image of the object in the air. However, there is a problem that it is difficult to see the floating image by using the dihedral corner reflector of tubular body as shown in FIG. 4, so that a real image with a feeling of float in the air is insufficient.

Although the dihedral corner reflector array optical element having internal sides within each penetrating hole used for mirror surfaces of as shown in FIG. 2 is the same on both sides in a manner that a floating image is formed thereby, however the inventors have found that the dihedral corner reflector array optical element having internal sides within each protrudent tubular body of a transparent material used for mirror surfaces of as shown in FIG. 4 is different on both sides in a manner that floating images are formed thereby. In case of the dihedral corner reflector array as shown in FIG. 2, the element structure (the penetrating hole) is symmetry on the front and back sides. In case of the dihedral corner reflector array as shown in FIG. 4, the element structure (the tubular body-side and the substrate-side) is asymmetry on the front and backsides. Namely, the inventors have found a problem of difficulty in seeing a floating image is caused by the asymmetry in that the protrudent tubular body-side has an uneven structure of (e.g., rows of plural cubic shape tubular bodies) at one side but at the other side, i.e., substrate-side is a smooth main surface. Further, the tubular body is a prism formed in such a manner that an optical hole in a protrudent tube is filled with a transparent material. Therefore, such a prism is so called as a protrudent boy in general hereinafter.

Accordingly, the present invention has been made in order to solve such a problem in view of how to see a floating image influenced by configuration of the dihedral corner reflector array optical element with an asymmetrical structure having a substrate provided with plural protrudent bodies formed of a transparent material, and it is an object of the present invention to provide a display device using the dihedral corner reflector array optical element which facilitates to see a floating image.

A display device using the dihedral corner reflector array optical element according to the present invention is a display device comprising: a dihedral corner reflector array optical element composed of a substrate and a plurality of dihedral corner reflectors arranged regularly on one main surface side of the substrate, wherein the dihedral corner reflectors include orthogonal mirror planes which are perpendicular to each other and being perpendicular to the one main surface side of the substrate; and an observed object which exists by the one surface side of the substrate, wherein the dihedral corner reflector array optical element forms a real image of the object by the other main surface side of the substrate. This display device using the dihedral corner reflector array optical element is characterized in that the dihedral corner reflector array optical element includes a plurality of protrudent bodies which are integrally formed of a transparent material of the substrate, each of the protrudent bodies including two sides of orthogonal mirror planes which are perpendicular to each other as the dihedral corner reflector perpendicular to the one main surface side of the substrate, and characterized in that the dihedral corner reflector array optical element is disposed so that the protrudent bodies face toward a space in which the observed object exists.

Further, it is preferable that each of the protrudent bodies has a frustum shape having an end plane whose area is smaller than that of the base plane side of the substrate, where each protrudent body is composed of a rectangular parallelepiped portion including the orthogonal plane sides to be a dihedral corner reflector and a taper portion integrated therewith having sides being non-parallel to the orthogonal plane sides. In case that a frustum of pyramid or truncated pyramid is used for each protrudent body, two sides other than two sides functioning the dihedral corner reflector and except the end plane and the base plane are inclined, and the angles of those two sides may be equal or not equal to each other.

In addition, the display device using the dihedral corner reflector array optical element exhibits a great effect is useful under surroundings that illuminated on a side of the dihedral corner reflector array optical element opposite to a space in which the observed object exists with respect to the dihedral corner reflector array optical element, i.e., the viewer side. This is because the dihedral corner reflector array optical element must exist behind a real image formed thereby. In other words, the viewer's eyes receive both of light emitted from a real image formed with light from the object and the reflected light at the viewer side of the dihedral corner reflector array optical element. The higher intensity of the reflected light from the dihedral corner reflector array optical element is than that of the real image, the higher difficulty to see the real image, so that there decrease a feeling of float in the air of the real image.

In general, illuminated light on the viewer side of the dihedral corner reflector array optical element almost becomes a so-called ambient light of incident rays from various directions dependent on n various aspects of use. Incident rays to a smooth surface are reflected to the regular reflection direction respectively. Therefore, rays from other than the regular reflection direction to the viewer are not observed by the viewer, even in incident rays reflected by the smooth surface. However, the viewer's eyes receive various rays from other than the regular reflection direction, since the plural protrudent bodies formed on the dihedral corner reflector array optical element complicatedly reflect light with its convex structure of the protrudent bodies. Namely, in this display device using the dihedral corner reflector array optical element with protrudent bodies facing the viewer, the intensity of reflected light by the dihedral corner reflector array optical element (side of formed plural protrudent bodies) is higher than that of the real image, so that it is difficult to see the real image and the feeling of float in the air of the real image decreases.

In contrast, according to the invention, there may be provided a lighting device for irradiating light to a side of the dihedral corner reflector array optical element opposite to a space in which the observed object exists with respect to the dihedral corner reflector array optical element. In this case, even in the state that the smooth surface of the dihedral corner reflector array optical element is faced ward the viewer, the ambient light is reflected to the regular reflection, so that the viewer cannot see light from the direction other than the regular reflection direction with respect to the viewer. Namely, according to this configuration, the intensity of reflected light by the dihedral corner reflector array optical element (side of the smooth surface) is lower than that of the real image, so that it is facilitated to see the real image and the feeling of float in the air of the real image increases. Therefore it is preferable that the lighting device is positioned so as to weaken or deteriorate intensity of light rays, in minimum, from the lighting device passing through the real image of the object with a positional relation of a regular reflection with respect to the dihedral corner reflector array optical element. There has been found that if, within illuminated light of the viewer side, partial light beams seen by a view with a positional relation of a regular reflection with respect to the dihedral corner reflector array optical element are strong, then the reverse configuration of the invention, i.e., the dihedral corner reflector array optical element is disposed so that the protrudent bodies face toward the viewer side. This is because the regular-reflected light is not scattered by the smooth plane surface of the dihedral corner reflector array optical element and it arrives at the viewer as it is. However, the display device of the present invention is useful at almost cases in practical use, since the viewer consciously avoids such a situation to watch to the floating image of real image, and the occurrence of such a situation is rare.

Namely, there is obtained the advantageous effect of the invention demonstrated effectively when partial light beams seen by a view with a positional relation of a regular reflection with respect to the dihedral corner reflector array optical element are weaken in intensity within light beams irradiated to the main surface of the dihedral corner reflector array optical element at the viewer side.

In addition, it is preferable to provide respectively metal reflective films on the plane sides of the protrudent body functioning as the dihedral corner reflector, since there is an increase in intensity of light complicatedly reflected by the convex structure of the protrudent bodies thereby the advantageous effect of the invention is demonstrated effectively.

According to the invention, the display device using the dihedral corner reflector array optical element with the protrudent bodies enables a viewer to observe a floating image of real image in condition it can be easily seen.

BRIEF DESCRIPTION OF THE DRAWINGS

The aforementioned aspects and other features of the present invention are explained in the following description, taken in connection with the accompanying drawing figures wherein.

DETAILED DESCRIPTION OF THE INVENTION

A dihedral corner reflector array optical element and a method for fabricating the same and a display device using the same of embodiments according to the present invention will be described herein below by referring to the drawings.

Figure 6:
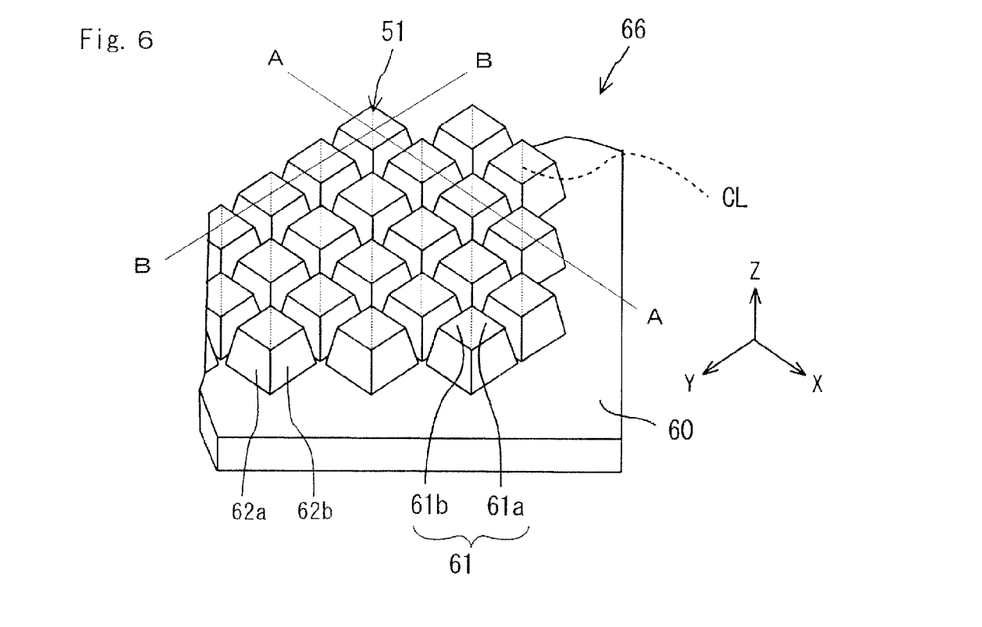
FIG. 6 is an enlarged partial cutaway perspective view illustrating schematically the dihedral corner reflector array optical element applied to the display device of the embodiment according to the present invention.
Figure 7A:
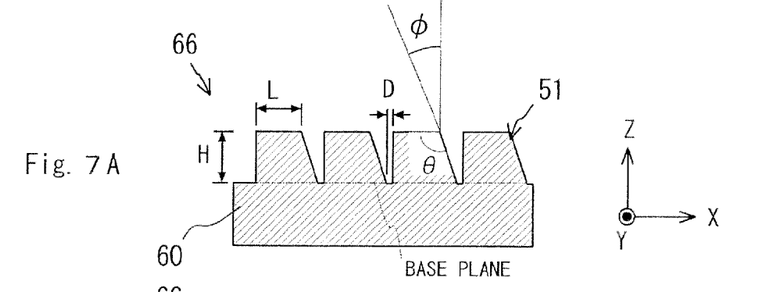
FIG. 7A and FIG. 7B show schematic cross-section views taken off at an A-A line and a B-B line in FIG. 6 respectively.
Figure 7B:
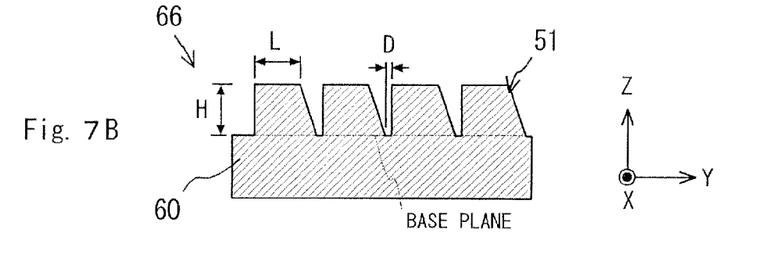

FIG. 6 shows an enlarged partial cutaway perspective view illustrating the dihedral corner reflector array optical element 66 having protrudent bodies 51 of the embodiment according to the present invention. Further, FIG. 7A and FIG. 7B are cross-section views taken off at an A-A line and a B-B line in FIG. 6 respectively.

The dihedral corner reflector array optical element 66 of the example comprises a substrate 60 of a flat board and a plurality of protrudent bodies 51 which are integrally formed of a transparent material wherein each protrudent body projects from a base plane of the substrate. On each protrudent body, two orthogonal plane sides (mirror surfaces 61a and 61b) are formed to be perpendicular to each other to be a dihedral corner reflector 61 at a line of intersection CL thereof. The plane sides 62a and 62b (other than two mirror surfaces of the dihedral corner reflector) of the protrudent body have some bearings (inclination) with respect to a normal line of the substrate 60. FIG. 7A and FIG. 7B show the measure of the protrudent body 51, a height H, a side length of the end plane L, an interval D, and an angle θ (i.e., inclination angle with respect to the end plane), for one example, the height H=170 µm, the side length of a square L=150 µm, the interval D=10 µm, the inclination angle θ=108° (φ=18°) as typical values, but the measure of the protrudent body is not limited by these values.

Figure 8:
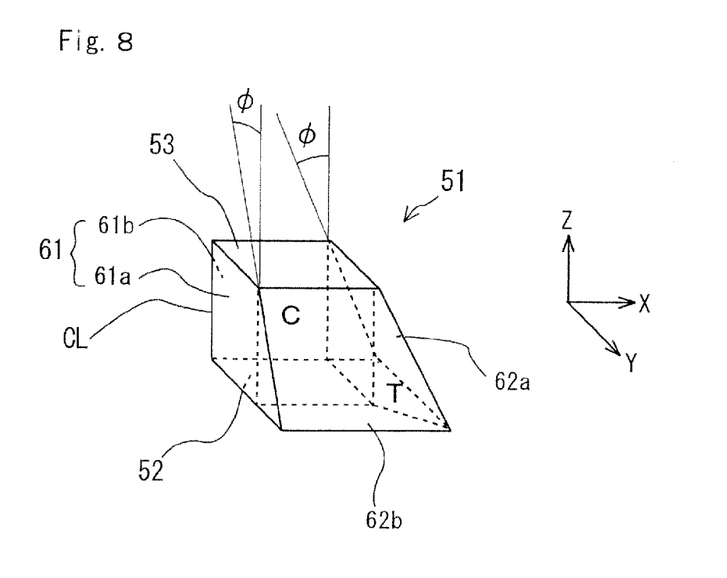
FIG. 8 is an enlarged perspective view illustrating schematically a protrudent body of the dihedral corner reflector array optical element of the embodiment according to the present invention.

As shown in FIG. 8, the sides 62a and 62b being non-parallel to the dihedral corner reflector belong to taper portions of a protrudent body with a truncated pyramid or frustum shape 51 which has an area of the end plane 53 smaller than that of the base plane 52 (the bottom plane) of the substrate side. The sides 62a and 62b being non-parallel to the dihedral corner reflector are taper faces. It is preferable to set a taper angle of each taper face (i.e., an angle formed between the taper face and a plane perpendicular to the substrate) to be an angle within range of 5° or more and 25° or less is suitable. When the taper angle is less than 5°, then the parting of dies is difficult. When the taper angle is more than 25°, then the protrudent body density decreases thereby to reduce luminous flux for the formation of real image.

As shown in FIG. 8, the protrudent body 51 has the truncated pyramid shape which is composed of a rectangular parallelepiped portion C (e.g., a cube) including the orthogonal plane sides 61a and 61b and a taper portion T having plane sides 62a and 62b being non-parallel to the orthogonal plane sides wherein the rectangular parallelepiped portion C and the taper portion T are integrated.

Figure 9:
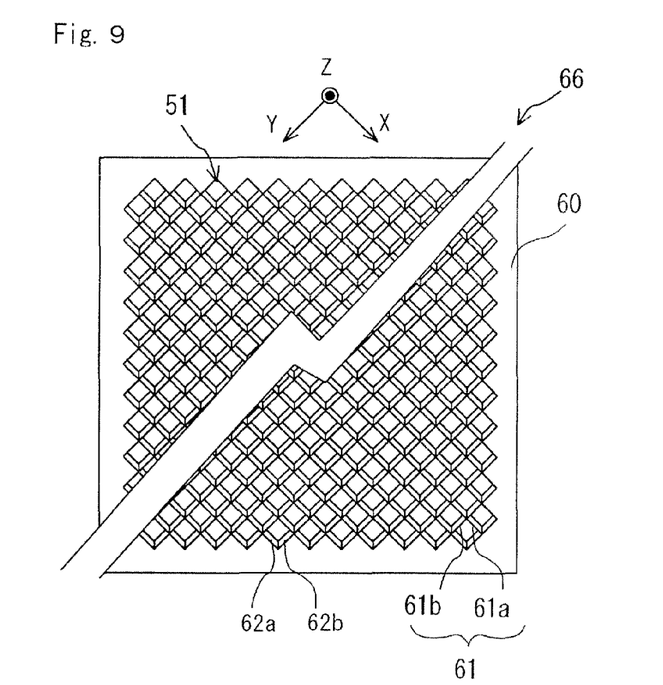
FIG. 9 is a partial cutaway plan view illustrating schematically a specific example of a dihedral corner reflector array optical element applied to the display device of the embodiment.

According to the present invention, as shown in FIG. 9, the dihedral corner reflector array optical element 66 is realized which comprises the transparent substrate 60 of a thin plate; and a plurality of transparent protrudent bodies 51 formed thereon, wherein each protrudent body 51 has a truncated pyramid shape (e.g., a square bottom plane, 50-200 µm per side) in the frontal view so that light passes through and between the base plane (bottom plane) and the top face, i.e., end plane of the protrudent body 51, wherein each protrudent body 51 has two orthogonal plane sides 61a and 61b used as the dihedral corner reflector 61. It may be configurable that some of the tapered surfaces that are not to form the dihedral corner reflectors 61 be subjected to no mirror finishing so that they will be made non-reflective or matte. It is also preferable that the dihedral corner reflectors 61 be arranged on regularly aligned lattice points so that the internal angles defined by the mirror surfaces 61a and 61b will be all positioned in the same direction on the substrate 60. Accordingly, a line of intersection CL of the orthogonal mirror surfaces 61a and 61b of each of the dihedral corner reflectors 61 is preferably orthogonal to the element surface 6S as shown in FIG. 6. In the below, the direction of the internal angle defined by the mirror surfaces 61a and 61b is called the orientation (direction) of the dihedral corner reflector 61. In addition, metal reflective films may be formed on the outer plane sides (inner wall plane sides 61a and 61b) of the protrudent body 51 functioning as dihedral corner reflectors, so that the reflective efficiency the dihedral corner reflector is improved.

Figure 10:
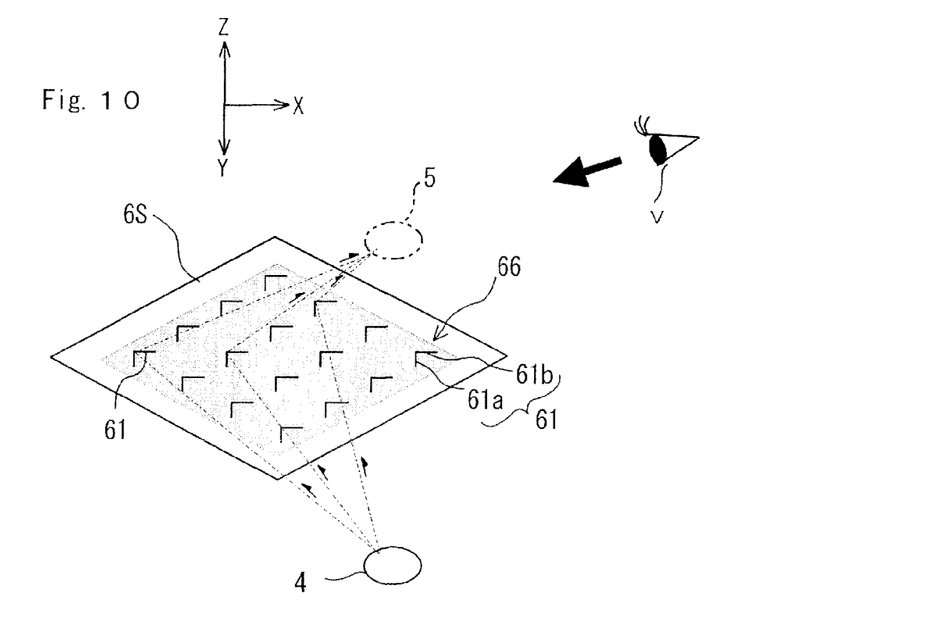
FIG. 10 is a schematic perspective view illustrating schematically how a real image is formed by a dihedral corner reflector array applied to the embodiment according to the invention.

As is schematically shown in FIG. 10, a display device according to the present invention comprises: a dihedral corner reflector array optical element 66 and an observed object 4 disposed by one surface side of the substrate, wherein the dihedral corner reflector array optical element forms a real image 5 (real specular image) of the object by the other surface side of the substrate. The dihedral corner reflector array optical element 66 is constructed of a large number of dihedral corner reflectors 61 each having two orthogonal mirror surfaces 61a and 61b, in which flat surface substantially orthogonal to the two mirror surfaces 61a and 61b of each of the dihedral corner reflectors 61 is defined as an element surface 6S. The real specular image 5 of the object 4 is formed at a position plane-symmetrical to the object 4 with respect to the element surface 6S. In the present embodiment, the dihedral corner reflectors 61 are considerably small (on the order of micrometers) compared to the entire size (on the order of centimeters) of the dihedral corner reflector array optical element 66. In FIG. 10, an aggregate of the dihedral corner reflectors 61 is shown in gray and a dihedral angle defined by the mirror surfaces are indicated by V shapes as showing an orientation of the interior corners thereof, so that the dihedral corner reflectors 61 are exaggeratedly shown in the figure.

In the dihedral corner reflector array optical element 66 of the embodiment, plane sides of the protrudent body are formed to be perpendicular to the substrate (61a, 61b in FIG. 10) expect inclined plane sides of the feature of the invention.

In each of the dihedral corner reflectors 61 constituting the dihedral corner reflector array optical element 66, light rays entering the corresponding hole via the rear side (from the object 4) are reflected by one mirror surface 61a (or 61b). The reflected light ray is further reflected by the other mirror surface 61b (or 61a), and is then caused to pass through the dihedral corner reflector 61 via the front side so that each dihedral corner reflector has a so-called twice reflection function. A path along which each light ray enters the dihedral corner reflector 61 and a path along which the light ray exits the dihedral corner reflector 61 are plane-symmetrical to each other with respect to the element surface 6S. Specifically, assuming that the element surface 6S is a surface passing the central portion of the height of each mirror surface and orthogonal to each mirror surface, the element surface 6S is a plane of symmetry with respect to which the position of the real image formed as a floating image, i.e., real specular image 5 of the object 4 is plane-symmetrical to the object 4 the object 4.

Figure 11:
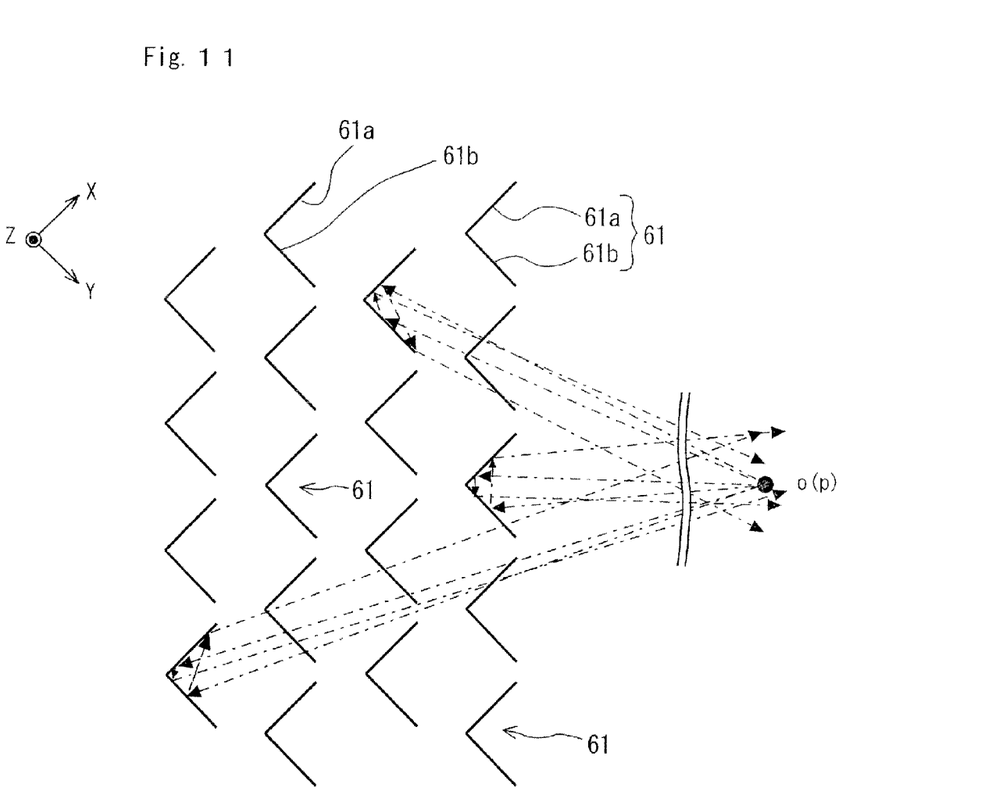
FIG. 11 is a schematic plan view illustrating how a real image is formed by the dihedral corner reflector array optical element applied to the display device of the embodiment according to the invention.
Figure 12:
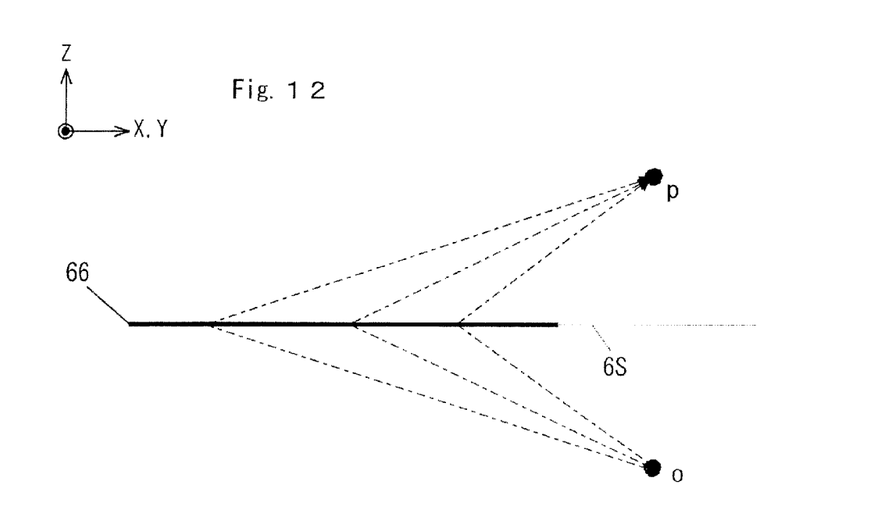
FIG. 12 is a schematic side view illustrating schematically how a real image is formed by the dihedral corner reflector array optical element applied to the display device of the embodiment according to the invention.

Briefly described next together with a path of each light ray emitted from a point light source (o) as an observed object is how an image is formed by the dihedral corner reflector array optical element 66. FIG. 11 is a schematic plan view of the dihedral corner reflector array optical element 66, and FIG. 12 is a schematic cross-section view of part of the dihedral corner reflector array optical element 66. In FIG. 11, the dihedral corner reflectors 61 and the mirror surfaces 61a, 61b are shown to be quite exaggerated in comparison to the entirety of the dihedral corner reflector array optical element 66. As is shown in FIGS. 11 and 12, when passing through the dihedral corner reflector array optical element 66, light rays emitted from the point light source (o) (indicated by one-dot arrowed chain lines traveling from the back toward the front on the drawing when viewed three-dimensionally in FIG. 11) are each reflected once by one mirror surface 61a (or 61b), and is reflected further by the other mirror surface 61b (or 61a) of each of the dihedral corner reflectors 61. Next, the reflected light rays pass through the element surface 6S, and then pass in dispersion a point that is plane-symmetrical to the point light source (o) with respect to the element surface 6S of the dihedral corner reflector array optical element 66. Incoming light rays and reflected light rays are shown to be parallel in FIG. 11. The reason therefor is as follows. In FIG. 11, the dihedral corner reflectors 61 are shown to be exaggeratedly large in comparison to the point light source (o). However, the actual size of the dihedral corner reflectors 61 is considerably small. Accordingly, incoming light rays and reflected light rays nearly overlap each other when the dihedral corner reflector array optical element 66 is viewed from above. (In FIG. 11, paths of light rays that first fall on both of the two mirror surfaces (61a, 61), namely, two paths, of each of the dihedral corner reflectors 61 are shown. In FIG. 12, only one light ray that first falls on either of the mirror surfaces is shown in order to avoid complication.) In summary, light rays converge to a position plane-symmetrical to the point light source (o) with respect to the element surface 6S, so that a real image is formed at a position (p) shown in FIGS. 11 and 12.

Embodiments

Figure 13:
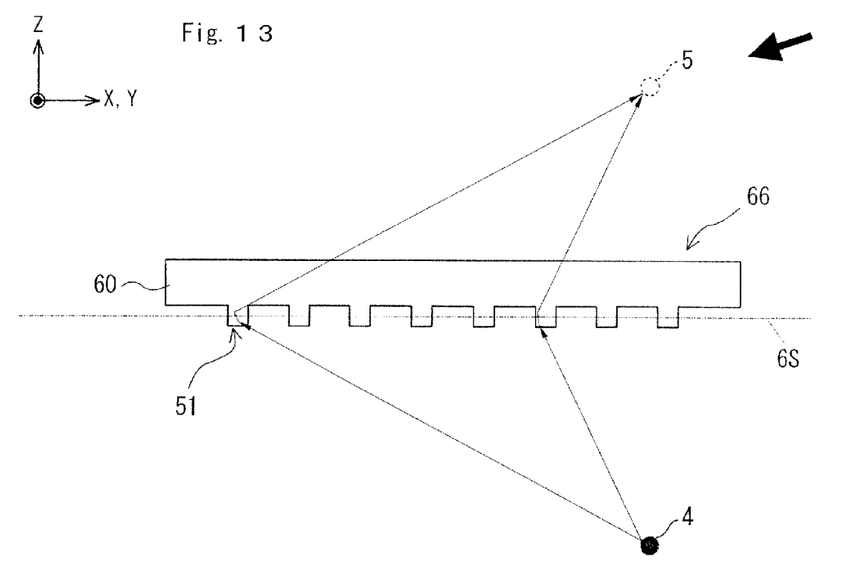
FIG. 13 is a schematic side view illustrating principal components of the display device using the dihedral corner reflector array optical element of the embodiment.
Figure 14:
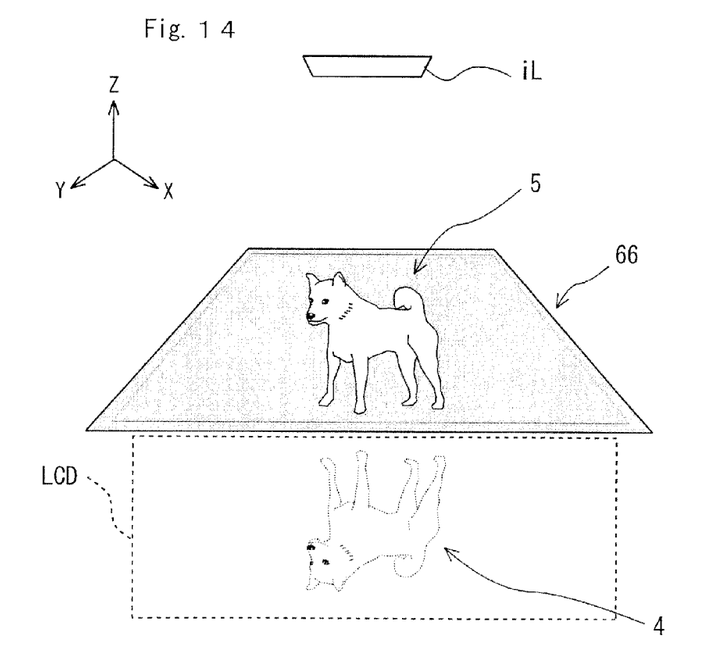
FIG. 14 is a schematic perspective view illustrating the display device of FIG. 13 with a floating image caused thereby when viewed from a viewer's sightline (an arrow in the figure)

FIG. 13 shows a schematic structure diagram illustrating a display device using the dihedral corner reflector array optical element as an embodiment. As shown in FIG. 13, the dihedral corner reflector array optical element 66 and the object 4 are positioned at an opposite side to the viewer side. A real image 5 (real specular image) of the object 4 is formed in a space of the viewer-side (a viewer's sightline is indicated by an arrow) with respect to the dihedral corner reflector array optical element 66 according to the foregoing principle, so that the viewer can see a floating image 5. The observed 4 may be a real body and the object 4 may be a picture exhibited in a display surface of a liquid crystal display panel or the like. FIG. 14 illustrates a state that a viewer is observing the display device of FIG. 13 with a floating image caused thereby when viewed from the viewer's sightline (an arrow in the figure). FIG. 14 shows that when a dog picture as an object 4 is exhibited in a liquid crystal display LCD in the object-side space, a real image 5 (real specular image) is formed in the viewer-side space.

Figure 15:
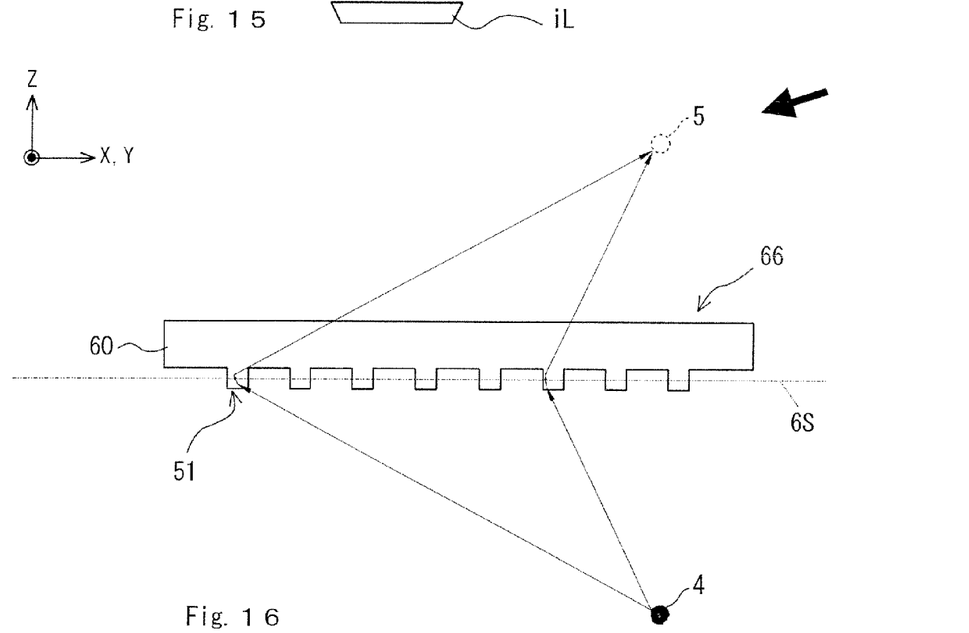
FIG. 15 is a schematic side view illustrating the display device of FIG. 13 with a floating image caused thereby when viewed under a lighting device fixed on an upper interior surface of a room.

As shown in FIG. 14, the real image 5 is formed behind which the dihedral corner reflector array optical element 66 exists to be seen as a floating image. When there is no illuminated light on the viewer side of the dihedral corner reflector array optical element 66, no reflection with the dihedral corner reflector array optical element occur, as a result, there is observed only a floating image 5 floated in a black back ground, but indeed there is illuminated with the so-called ambient light from various directions on the viewer side surface of the substrate 60 of the dihedral corner reflector array optical element 66 in a practical use. Considerable common environmental situation is a room in which the lighting device iL is provided at an upper portion such as its ceiling, thus a floating image formed by using the embodiment of optical device is observed almost in such a situation. In this case, there is directly irradiated light from the lighting device iL at the upper portion (see FIG. 15). By the way there is irradiated light such as reflected light by the walls etc. other than the direct light from various directions onto the substrate 60, but they are not considered for concise description since such an indirect light is remarkably weaker in intensity than the direct light. In the embodiment, since the dihedral corner reflector array optical element 66 is positioned so that the main surface with cubic protrudent bodies 51 thereof faces toward the object-side, the smooth main surface of the substrate 60 faces toward the viewer-side. Thus, the direct light irradiated on the smooth surface from the lighting device iL at the upper side is reflected with a reflection angle equivalent to an incident angle to the upper direction, so that almost of light is not in the viewer's visibility, but indeed the illuminating light radiate with all sides distribution of luminous intensity, so that apart of light radiation travels in the regular reflection to the viewer at the main surface of the substrate. Therefore the illuminating light of the regular reflection is previously set in intensity so as to be weakened in minimum at a real image position in the viewer's sightline. Therefore, although the ambient light exists, the viewer can see easily a floating image with a high feeling of float in the air of a real image 5, because the viewer receives strongly light from the real image in comparison with the reflected light of the ambient light on the dihedral corner reflector array optical element 66.

Figure 16:
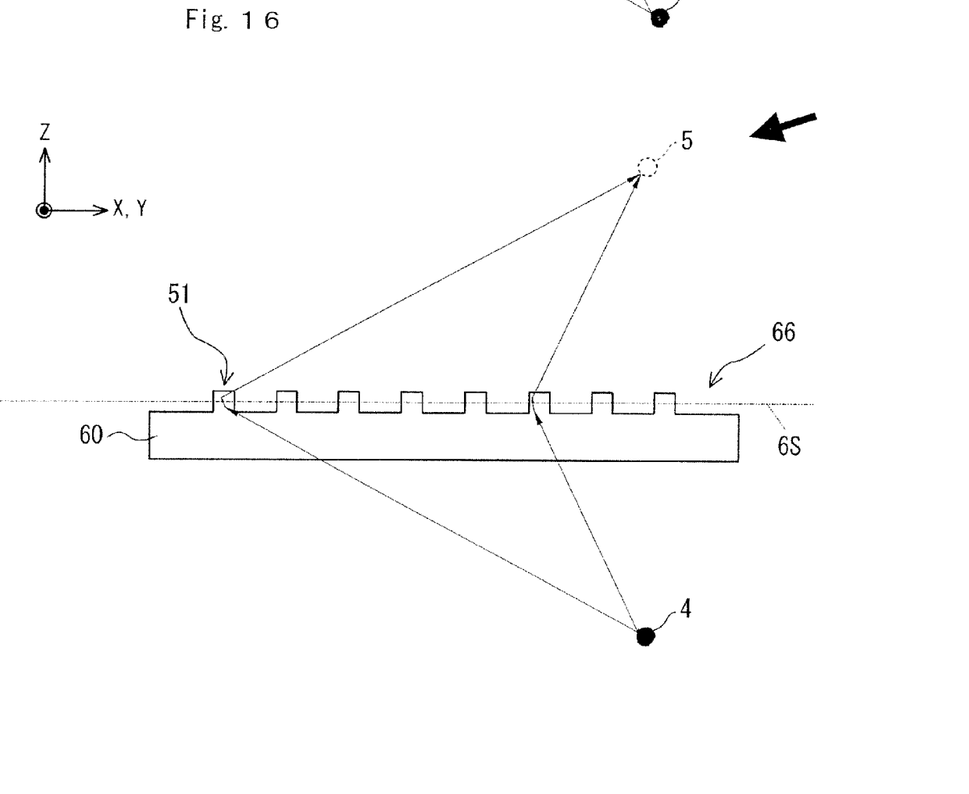
FIG. 16 is a schematic side view illustrating principal components of the display device using the dihedral corner reflector array optical element of a comparative example.
Figure 17:
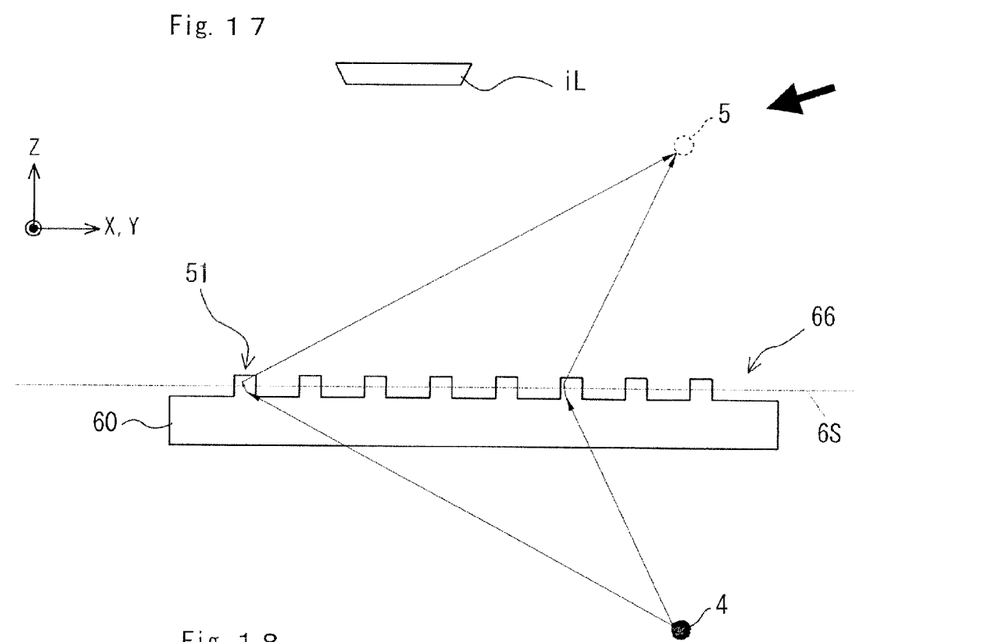
FIG. 17 is a schematic side view illustrating the display device of FIG. 16 with a floating image caused thereby when viewed under a lighting device fixed on an upper interior surface of a room.

FIG. 16 shows a schematic structure diagram of a comparative example. A dihedral corner reflector array optical element 66 and an observed object 4 are positioned as shown in FIG. 16. The difference from the embodiment is upside down in the position of the dihedral corner reflector array optical element 66, that is, the dihedral corner reflector array optical element 66 is merely positioned so that the main surface with cubic protrudent bodies 51 thereof faces toward the viewer-side. Similarly to the embodiment, there is considered the common environmental situation of a room in which the lighting device iL is provided at an upper portion such as its ceiling, in which a floating image 5 formed by using the embodiment of optical device is observed (see FIG. 17).

Figure 18:
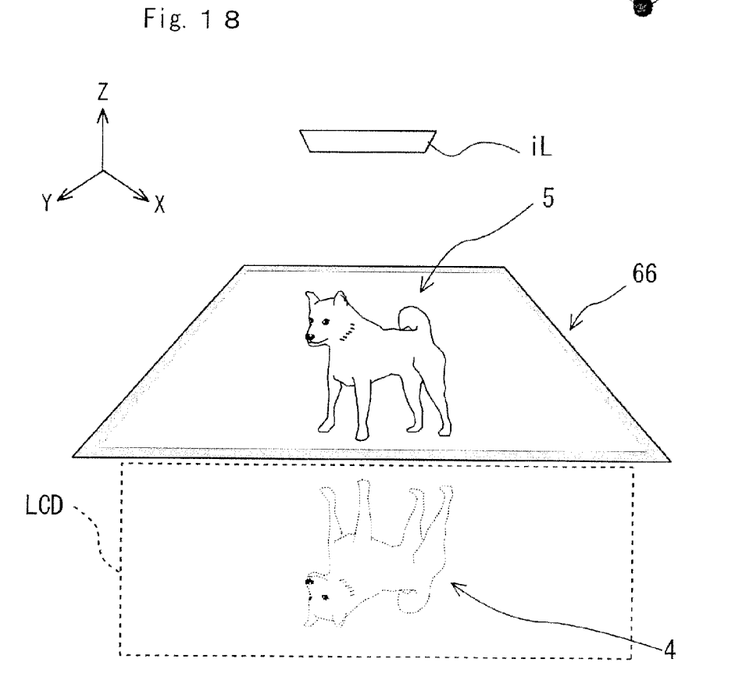
FIG. 18 is a schematic perspective view illustrating the display device of FIG. 16 with a floating image caused thereby when viewed from a viewer's sightline (an arrow in the figure).

In the comparative example, the dihedral corner reflector array optical element 66 is positioned so that the main surface with cubic protrudent bodies 51 thereof faces toward the viewer-side. The viewer's eyes receive some of various rays from other than the regular reflection direction, because the plural protrudent bodies 51 formed on the dihedral corner reflector array optical element 66 complicatedly reflect light with its the convex structure thereof. Namely, in this configuration, the intensity of reflected light by the dihedral corner reflector array optical element 66 (side of formed plural protrudent bodies) becomes higher than that of the real image 5, so that it is difficult to see the real image and the feeling of float in the air of the real image decreases (see FIG. 18).

The dihedral corner reflector array optical element 66 used for the embodiment and the comparative example has been formed through an injection molding process using an acryl resin with transparency. Therefore, light reflections occur at both surfaces of the entering-side and the reverse-side apart from each other with the transparent resin thickness. Though there may be considered that if the both surface reflections generate light rays in the same intensity then no difference occurs between the embodiment and the comparative example, e.g., the positioning of the front and back sides of the dihedral corner reflector array optical element does not generate any difference, however we have found that the light reflection at the light entering-side is superior to that of the reverse-side in the dihedral corner reflector array optical element used in this experiments. Such a situation occurs similarly to a display device having the lighting device and the dihedral corner reflector array being included as one piece.

Though there may be considered that if the dihedral corner reflector array optical element is formed of another transparent resin having a refractive index different from that of an acryl resin then such an optical element may generate the other effect different from the advantageous effect of the embodiment, it is not considered that the relationship between the positioning of the embodiment of the dihedral corner reflector array optical element (the front and back sides) and the appearance of floating image becomes reversal.

As described above, it is preferable to provide reflective films such as metal films on the orthogonal plane sides of the protrudent body functioning as dihedral corner reflectors. The inventors have found that the forming of reflective films may be omitted, and a product as resin-molded of the optical element, i.e., a dihedral corner reflector array optical element without any reflective film has performed the formation of real image with a sufficient light flex in practice because there is obtained a sufficient difference in refraction index between the resin and the air. Since a product as resin-molded of the optical element, i.e., a dihedral corner reflector array optical element without any reflective film is usable, the invention therefore provides a low cost display device for allowing a viewer to see a real image (real specular image) of an observed object in air.

It is understood that the foregoing description and accompanying drawings set forth the preferred embodiments of the present invention at the present time. Various modifications, additions and alternative designs will, of course, become apparent to those skilled in the art in light of the foregoing teachings without departing from the spirit and scope of the disclosed invention. Thus, it should be appreciated that the present invention is not limited to the disclosed embodiments but may be practiced within the full scope of the appended claims.

This application is based upon and claims the benefit of priority from the prior Japanese Patent Application No. 2010-270257, filed on Dec. 3, 2010, the entire contents of which is incorporated herein by reference.

What is claimed is:

1. A display device comprising:
    a dihedral corner reflector array optical element comprising: a substrate, and a plurality of protrudent bodies arranged regularly on and each protruding from a base plane at a first main surface side of the substrate, wherein the protrudent bodies and the substrate are integrally formed of a transparent material, and wherein each of the protrudent bodies includes two sides of orthogonal mirror planes which are perpendicular to each other to constitute a dihedral corner reflector perpendicular to the first main surface side of the substrate;
    an observed object which exists by the one surface side of the substrate so that the protrudent bodies face toward a space in which the observed object exists, wherein the dihedral corner reflector array optical element forms a real image of the object by a second main surface side of the substrate; and
    a lighting device for irradiating light to a side of the dihedral corner reflector array optical element opposite to the space in which the observed object exists with respect to the dihedral corner reflector array optical element, the lighting device being positioned so as to weaken an intensity of light rays from the lighting device passing through the real image of the object with a positional relation of a regular reflection with respect to the dihedral corner reflector array optical element.

2. The display device according to claim 1, wherein each of the protrudent bodies has a frustum shape having an end plane whose area is smaller than an area of the frustum shape at the base plane, and wherein each protrudent body is composed of a rectangular parallelepiped portion including the orthogonal plane sides to be the dihedral corner reflector and a taper portion integrated with the rectangular parallelepiped portion and having sides that are not parallel to the orthogonal plane sides.

3. The display device according to claim 1, further comprising metal reflective films adhered on the plane sides of the protrudent body functioning as the dihedral corner reflector.

* * * * *